United States Patent
Swan

(10) Patent No.: US 10,930,155 B2
(45) Date of Patent: Feb. 23, 2021

(54) INFRASTRUCTURE SENSOR DETECTION AND OPTIMIZATION METHOD

(71) Applicant: Continental Automotive Systems, Inc., Auburn Hills, MI (US)

(72) Inventor: Vivian Swan, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/207,691

(22) Filed: Dec. 3, 2018

(65) Prior Publication Data
US 2020/0175875 A1    Jun. 4, 2020

(51) Int. Cl.
| | | |
|---|---|---|
| G08G 1/16 | (2006.01) | |
| G01S 13/86 | (2006.01) | |
| G01S 13/931 | (2020.01) | |
| G06K 9/00 | (2006.01) | |
| H04N 7/18 | (2006.01) | |
| H04N 17/00 | (2006.01) | |

(52) U.S. Cl.
CPC ............ *G08G 1/166* (2013.01); *G01S 13/867* (2013.01); *G01S 13/931* (2013.01); *G06K 9/00785* (2013.01); *H04N 7/183* (2013.01); *H04N 17/002* (2013.01)

(58) Field of Classification Search
None
See application file for complete search history.

(56) References Cited

U.S. PATENT DOCUMENTS

| | | | | |
|---|---|---|---|---|
| 7,804,440 | B1 * | 9/2010 | Orr | G01S 7/022 342/20 |
| 8,315,766 | B2 * | 11/2012 | Rebut | B60Q 1/143 348/149 |
| 8,390,476 | B2 * | 3/2013 | Lock | G08G 1/0175 340/916 |
| 8,504,233 | B1 * | 8/2013 | Ferguson | G06K 9/00798 701/23 |
| 9,840,253 | B1 * | 12/2017 | Prasad | B60W 30/12 |

(Continued)

OTHER PUBLICATIONS

M. Pourmehrab, L. Elefteriadou and S. Ranka, "Smart intersection control algorithms for automated vehicles," 2017 Tenth International Conference on Contemporary Computing (IC3), Noida, 2017, pp. 1-6 (Year: 2017).*

(Continued)

*Primary Examiner* — Jayanti K Patel
*Assistant Examiner* — Stefan Gadomski

(57) ABSTRACT

An infrastructure-based warning system, where the system is used as part of an intelligent intersection or intelligent road, and is used to detect various objects, such as vulnerable road users (VRUs) and vehicles. The system includes both cameras and radar, the operation of which is optimized based on which of the camera or radar is least affected by current conditions. This optimization includes the use of a marker, attached to infrastructure in the field of view of the detection device, such as a camera, to be optimized. If the camera accurately and consistently detects the marker, then camera detections of objects are weighted with more significance than the detection of objects using radar. If on the other hand, if the camera is unable to accurately detect the marker because of ambient conditions, then the greatest amount of confidence is placed on radar detection.

22 Claims, 3 Drawing Sheets

(56) References Cited

U.S. PATENT DOCUMENTS

| | | | | |
|---|---|---|---|---|
| 10,127,461 B2* | 11/2018 | Viswanathan | | G06T 7/70 |
| 10,127,462 B1* | 11/2018 | Pratt | | G06K 9/00798 |
| 2003/0016288 A1* | 1/2003 | Kaylor | | H04N 7/181 |
| | | | | 348/149 |
| 2004/0222904 A1* | 11/2004 | Ciolli | | G08G 1/04 |
| | | | | 340/937 |
| 2006/0181433 A1* | 8/2006 | Wolterman | | G08G 1/08 |
| | | | | 340/917 |
| 2007/0257819 A1* | 11/2007 | Manor | | G08G 1/01 |
| | | | | 340/933 |
| 2008/0181488 A1* | 7/2008 | Ishii | | B60R 1/00 |
| | | | | 382/154 |
| 2010/0100324 A1* | 4/2010 | Caminiti | | G08G 1/0104 |
| | | | | 701/301 |
| 2010/0271497 A1* | 10/2010 | Monsive, Jr. | | G08G 1/04 |
| | | | | 348/211.99 |
| 2010/0322476 A1* | 12/2010 | Kanhere | | G08G 1/0175 |
| | | | | 382/103 |
| 2011/0035140 A1* | 2/2011 | Candy | | G08G 1/052 |
| | | | | 701/119 |
| 2013/0002871 A1* | 1/2013 | Natroshvili | | G06T 7/80 |
| | | | | 348/148 |
| 2013/0093895 A1* | 4/2013 | Palmer | | G08G 1/04 |
| | | | | 348/149 |
| 2013/0120575 A1* | 5/2013 | Byun | | H04N 7/18 |
| | | | | 348/148 |
| 2013/0201051 A1 | 8/2013 | Kreter et al. | | |
| 2013/0300583 A1* | 11/2013 | Wignot | | G01S 13/91 |
| | | | | 340/907 |
| 2013/0307981 A1* | 11/2013 | Jang | | H04N 7/18 |
| | | | | 348/148 |
| 2013/0342822 A1* | 12/2013 | Shiraishi | | G01S 17/936 |
| | | | | 356/4.01 |
| 2014/0307087 A1* | 10/2014 | Evanitsky | | G08G 1/164 |
| | | | | 348/143 |
| 2015/0040409 A1* | 2/2015 | Morrison | | F41B 5/1492 |
| | | | | 33/228 |
| 2015/0339920 A1* | 11/2015 | Cortelyou | | G06K 9/00771 |
| | | | | 340/907 |
| 2016/0012589 A1* | 1/2016 | Hamer | | H04N 5/247 |
| | | | | 348/148 |
| 2016/0097849 A1* | 4/2016 | Nichols | | G01S 13/91 |
| | | | | 342/107 |
| 2016/0125246 A1* | 5/2016 | Ryhorchuk | | H04N 5/23219 |
| | | | | 348/143 |
| 2016/0203606 A1* | 7/2016 | Arata | | G06T 7/80 |
| | | | | 348/148 |
| 2016/0275683 A1* | 9/2016 | Sakano | | G06T 7/80 |
| 2017/0032526 A1* | 2/2017 | Gao | | B60R 11/04 |
| 2017/0046977 A1* | 2/2017 | Becker | | G09B 19/003 |
| 2017/0323227 A1* | 11/2017 | Sadeghi | | G07F 17/246 |
| 2017/0337699 A1* | 11/2017 | Wu | | G06T 7/80 |
| 2017/0372607 A1* | 12/2017 | Janovec | | G08G 1/0962 |
| 2018/0189532 A1* | 7/2018 | Bataller | | G06K 7/10811 |
| 2018/0253630 A1* | 9/2018 | Tamer | | G06T 11/60 |
| 2018/0307245 A1* | 10/2018 | Khawaja | | G05D 1/0276 |
| 2018/0324908 A1* | 11/2018 | Denker | | H05B 6/6435 |
| 2018/0325415 A1* | 11/2018 | Ehrl | | G06T 7/85 |
| 2019/0094331 A1* | 3/2019 | Adireddy | | G01S 1/68 |
| 2019/0096246 A1* | 3/2019 | Zydek | | H04W 4/44 |
| 2019/0102911 A1* | 4/2019 | Natroshvili | | G06T 7/80 |
| 2019/0114911 A1* | 4/2019 | Rezaei | | G01C 21/26 |
| 2019/0118712 A1* | 4/2019 | Shigemura | | B60R 1/00 |
| 2019/0147609 A1* | 5/2019 | Lohry | | G06K 9/00201 |
| | | | | 382/154 |
| 2019/0197887 A1* | 6/2019 | Modi | | G08G 1/0116 |
| 2019/0248629 A1* | 8/2019 | Wieschemann | | B66C 13/18 |

OTHER PUBLICATIONS

Yang, Jidong J., and Bashan Zuo. "Performance of smart sensor detectors for stop-bar detection at signalized intersections." Journal of Transportation Engineering, Part A: Systems 143.6 (2017): 04017020. (Year: 2017).*

International Search Report and Written Opinion of the International Searching Authority dated Mar. 2, 2020 for the counterpart PCT Application No. PCT/US2019/063915.

* cited by examiner

INFRASTRUCTURE SENSOR DETECTION AND OPTIMIZATION METHOD

FIELD OF THE INVENTION

The invention relates generally to a system for detecting objects using various types of detection devices, which is optimized based on whether the operation of one of the detection devices is compromised. The system is able to be integrated into local infrastructure, and is able to detect vehicles and pedestrians which may not be readily visible to other drivers.

BACKGROUND OF THE INVENTION

Signalized and unsignalized intersections and cross-walks for pedestrians present one of the most dangerous areas where accidents may occur, such as an vehicle hitting a vulnerable road user, such as a pedestrian. Additionally, pedestrians are also distracted by cell phones, tablet computers, billboards, other pedestrians, and the like, which may limit the ability of the pedestrian to be fully aware of any dangers resulting from vehicles that may be driving unsafely.

One of the solutions to prevent accidents at various intersections is the implementation of sensors and other types of detection devices which are used to identify the location and direction of various pedestrians and vehicles.

The functionality of these detection devices may be limited under various conditions. One example of a detection device is a camera, and the functionality of a camera may be affected by ambient conditions, such as snow, rain, fog, the angle of the sun, etc., all of which may block or otherwise compromise the effectiveness of the camera. Conversely, a radar is not affected by the conditions mentioned above, but is not as accurate at detecting or classifying individual objects compared to a camera when conditions are more ideal.

Accordingly, there exists a need for a system for detecting objects at an intersection, where the system has more than one type of detection device, and the operation of which is optimized based on ambient conditions.

SUMMARY OF THE INVENTION

The present invention is a system for detecting objects using various types of detection devices, where the system is used as part of an intelligent intersection or intelligent road, and is used to detect various objects, such as vulnerable road users (VRUs) and vehicles. The system includes both cameras and radar, the operation of which is optimized based on current conditions. Infrastructure mounted cameras and radar have the ability to detect cross-traffic long before onboard vehicle sensors. Such intelligent infrastructure is able to detect each VRU and various approaching vehicles and broadcast each vehicle's position, velocity, heading etc., as a basic safety message (BSM) over dedicated short-range communication (DSRC) or LTE to other vehicles, or VRUs. The vehicle receives the BSM from the infrastructure and provides the driver with an HMI warning that it is unsafe to move out into the crosswalk and road. Alternatively, each VRU may receive a warning (on their mobile device for example) that is it unsafe to cross an intersection due to an approaching vehicle.

Camera and radar may perform better or worse when detecting VRUs under different conditions. When used as part of an intelligent intersection, according to the present invention the combination of camera and radar are used to detect VRUs, and the detection is optimized based on which of the camera or radar is least affected by current conditions. Under conditions where viewing area of the camera is not obstructed by snow, ice, rain, etc., the camera detects objects more accurately when compared to radar. However, if conditions are adverse for camera detection, i.e. if the camera's view is obscured or effected by conditions which may include snow, rain, fog or sun, then camera detection is severely limited, and radar detection is more accurate, as radars are not affected by these conditions.

This optimization of detection device performance includes the use of a marker, placed at ground level, or near ground level, and attached to infrastructure in the field of view of the detection device, such as a camera, to be optimized. If the camera accurately and consistently (i.e., with a large degree of confidence) detects the marker, then camera detections of objects such as VRUs and vehicles are weighted (i.e., treated with a greater degree of confidence) with more significance than the detection of objects using radar. If on the other hand, the camera is unable to accurately or consistently detect the marker because of ambient conditions, then the greatest amount of confidence is placed on radar detections of VRUs as radar detection is unaffected by these conditions. This ensures that the intelligent intersection system provides detections of VRUs and vehicles which are as accurate as possible, regardless of ambient conditions.

In one embodiment, the system of the present invention includes cameras and radars which are mounted and used as part of an intelligent intersection. The cameras detect special markers located at ground level, which are connected to other infrastructure. For example, an intersection may include one or more different posts, each post having a camera mounted near the top of the post, and a marker located at or near ground level. If the camera on the first post is able to detect the marker one of the other posts, then the information obtained by the camera is used. If the camera is unable to detect the markers on one of the other posts, then it is not certain that the camera is detecting each VRU with the desired level of accuracy, information obtained by the radar is therefore used instead.

In one embodiment, the present invention is an infrastructure-based warning system, which includes a first detection device, a second detection device, and a detection area. The first detection device and the second detection device both operable for detecting at least one of the location, speed, and direction of each of a plurality of objects in the detection area. At least one marker is located within the detection area, and the first detection device is operable for detecting the marker. The infrastructure-based warning system of the present invention also includes an optimization function, and the optimization function includes using or more heavily weighting information obtained by the second detection device when the first detection device is unable to detect the at least one marker.

In one embodiment, the marker is located at ground level, and the first detection device is calibrated using the marker.

In an embodiment, a first communication device in electrical communication with the first detection device and the second detection device. The first communication device uses information from the first detection device when the first detection device is able to detect the marker, and the first communication device uses information from the second detection device when the first detection device is unable to detect the marker.

In an embodiment, the present invention includes a warning device in electrical communication with the first communication device. The first communication device is able to command the warning device to generate a warning signal based on information received from the first detection device when the first detection device is able to detect the marker. The first communication device is also able to command the warning device to generate the warning signal based on information received from the second detection device when the first detection device is unable to detect the marker.

One of the objects in the detection area may be a vehicle, and the warning device generates the warning signal and directs the warning signal to the at least one vehicle when there is a danger of collision with another of the objects in the detection area.

One of the objects in the detection area may be at least one vulnerable road user, wherein the warning device generates the warning signal and directs the warning signal to the vulnerable road user when there is a danger of collision with another of the objects in the detection area.

In an embodiment, the first detection device a camera, and the second detection device is a radar.

In an embodiment, the first detection device and the second detection device are connected to at least one infrastructure component, where the infrastructure component is one selected from the group consisting of a building, a bridge, a parking structure, and a support structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
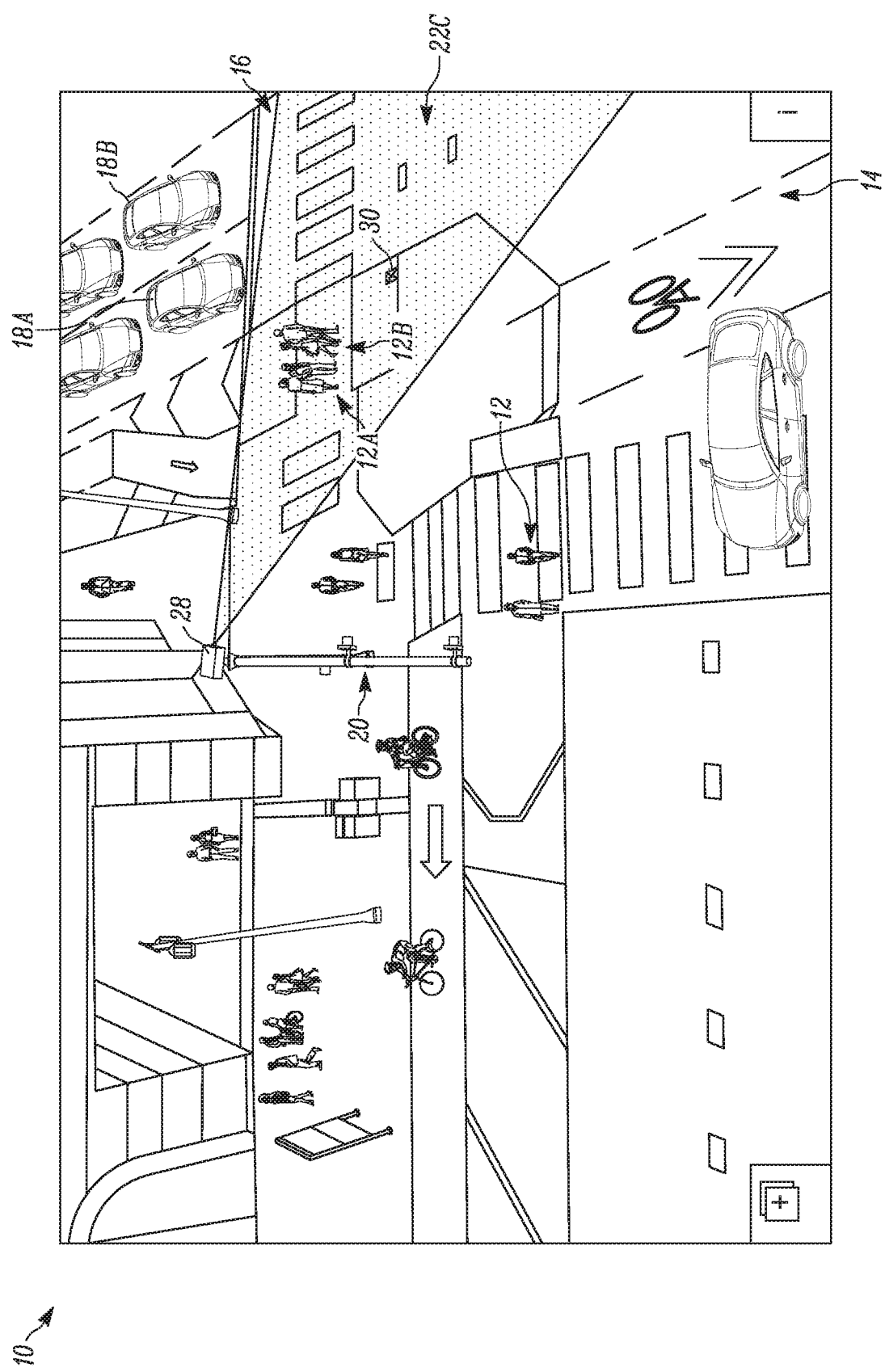
FIG. 1 is a diagram of a first example of an optimized infrastructure-based warning system, according to embodiments of the present invention.

The present invention is a system for detecting objects using various types of detection devices, where the operation of the detection devices is optimized. The system is used as part of an intelligent intersection or intelligent road, and is used for providing a warning to various vulnerable road users (VRUs) and vehicles of potential collisions. A diagram of a first example of an optimized infrastructure-based warning system according to the present invention is shown in FIG. 1, generally at 10. There are also several VRUs, shown in the diagram generally at 12, travelling near an intersection, shown generally at 14. More specifically, there are two vulnerable road users 12A,12B attempting to cross the intersection 14 at a cross-walk, shown generally at 16. A first vehicle 18A is stopped near the cross-walk 14, and a second vehicle 18B is moving towards the intersection 16 in a direction that is perpendicular to the direction of travel of each of the VRUs 12A,12B.

The warning system 10 includes some type of infrastructure component, which in this embodiment is a post, shown generally at 20, and connected to the post 20 is a first detection device 22A, a second detection device 22B, at least one communication device 24, and at least one warning device 26. While in this embodiment, the infrastructure component is the post 20, it is within the scope of the invention that the warning system 10 may include any other type of infrastructure component, such as a building, bridge, parking structure, support structure, or the like. In this embodiment, the detection devices 22A,22B, communication device 24, and the warning device 26 are integrated into a single component shown generally at 28 connected to the post 20, but it is within the scope of the invention that the detection devices 22A,22B, communication device 24, and the warning device 26 may be separate components in different locations. The detection devices 22A,22B in this embodiment are able to detect objects in a detection area, shown generally at 22C. In one embodiment, the first detection device 22A is a camera, and the second detection device 22B is a radar. Both of the camera 22A and the radar 22B are able to detect objects in the detection area 22C. Also located in the detection area 22C is a marker 30, the marker 30 is embedded in an area of concrete adjacent the cross-walk 16, such that the marker 30 is located at ground level. In one embodiment, the marker 30 is a plate marker with a checkerboard pattern. However, it is within the scope of the invention that the marker 30 may be any type of marker having a design which is unique, and is not seen elsewhere in the intersection. Other embodiments of the marker may include, but are not limited to, a sequence of black and while lines, a type of bar code, or a logo.

In the example shown in FIG. 1, the first vehicle 18A is blocking the view of each VRU 12A,12B crossing the intersection 14, such that each VRU 12A,12B is unable to see the second vehicle 18B approaching the intersection 14. If each VRU 12A,12B continues to walk through the intersection 14 unaware of the path of travel of the second vehicle 18B, the second vehicle 18B may collide with and seriously injure or kill one of the VRUs 12A,12B. However, the system 10 of the present invention includes the camera 22A and radar 22B, each of which is able to send a signal to the communication device 24 providing an indication of the location, speed, and direction of any object (either VRU or vehicle) in the detection area 22A.

In FIG. 1, the detection camera 22A and radar 22B are able to detect the location, as well as speed and direction of each vehicle 18A,18B, and the location, speed, and direction of each VRU 12A,12B. If there is a potential risk of collision between the second vehicle 18B and one of the VRU's 12A,12B in the detection area 22C detected by the camera 22A and radar 22B, a signal is sent to the communication device 24, such that the communication device 24 sends a signal to the warning device 26 to alert each VRU 12A,12B that there is a potential danger of collision with the vehicle 18B. The warning device 26 then sends out a warning alert, an example of which is audible sounds, indicated generally at 28, indicating to each VRU 12A,12B that there is a potential danger when entering the cross-walk 16. This allows each VRU 12A,12B to take measures to avoid entering the cross-walk 16 before it is safe to do so.

The optimized infrastructure-based warning system 10 of the present invention may be used with intersections located anywhere. Some intersections are located in areas where the climate and ambient conditions vary, depending upon the time of year. For example, some intersections may be located in areas where inclement weather may occur, and the system 10 is exposed to rain, snow, ice, fog, or sun such that the effectiveness of the camera 22A may be limited, and the radar 22B is still able to detect objects in the detection area 22C because the radar 22B is unaffected by these conditions.

The system 10 of the present invention includes an optimization function. In order to optimize the operation of the system 10, the optimization function includes determining whether it is best to use information obtained from the camera 22A or information obtained from the radar 22B. This is achieved by using the marker 30, and determining whether the camera 22A is able to detect the marker 30. If the camera 22A is able to detect the marker 30, then information (regarding the location, speed and direction of each vehicle 18A,18B, and the location, speed, and direction of each VRU 12) obtained from the camera 22A is used to determine whether a warning alert is needed. However, if the camera 22A is unable to detect the marker 30 due to exposure to adverse conditions, such as rain, snow, ice, fog, sun, etc., then information (regarding the location, speed and direction of each vehicle 18A,18B, and the location, speed, and direction of each VRU 12) obtained from the radar 22B is used to determine whether a warning alert is needed.

Figure 2:
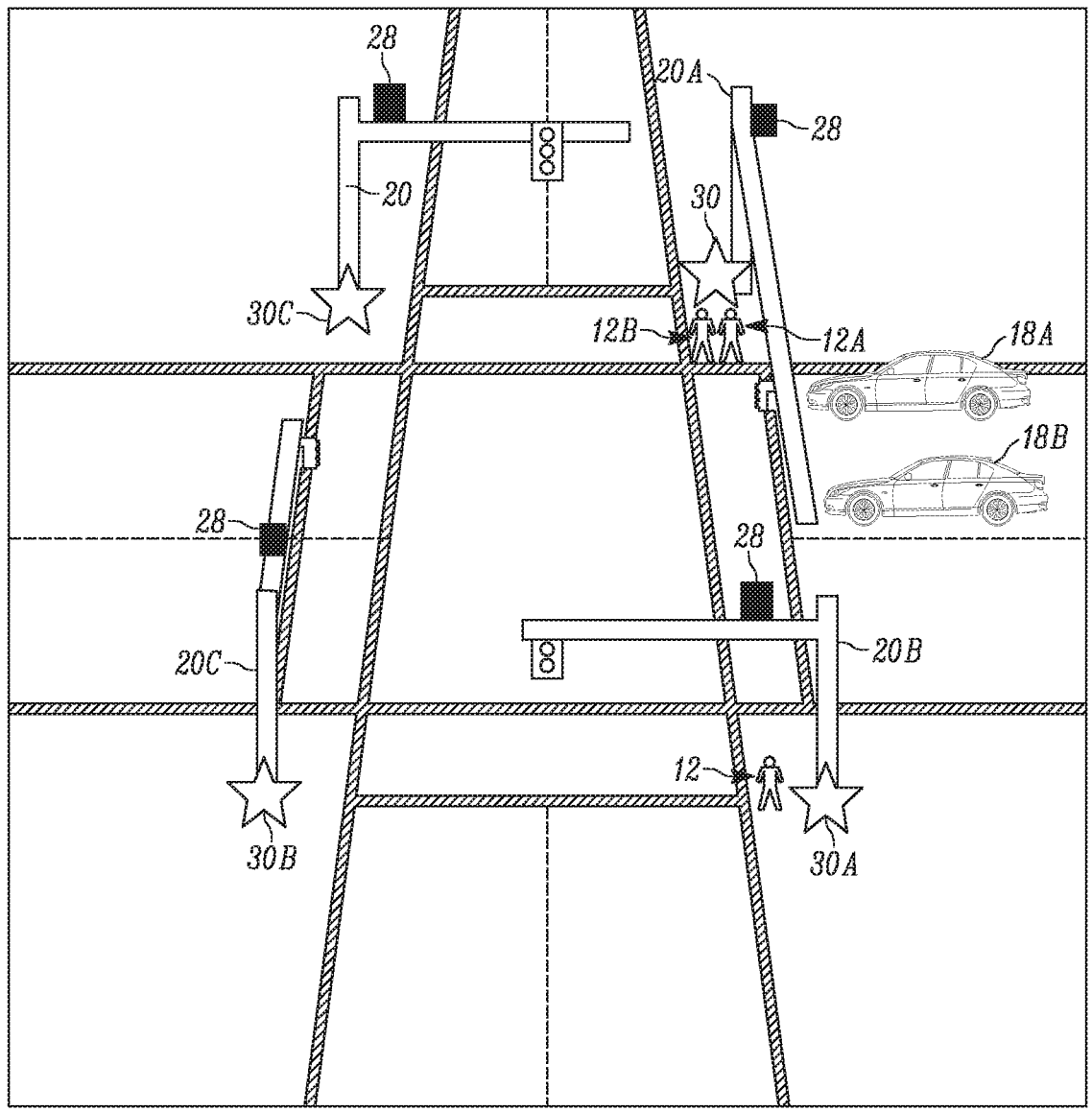
FIG. 2 is a diagram of a second example of an optimized infrastructure-based warning system, according to embodiments of the present invention.
Figure 3:
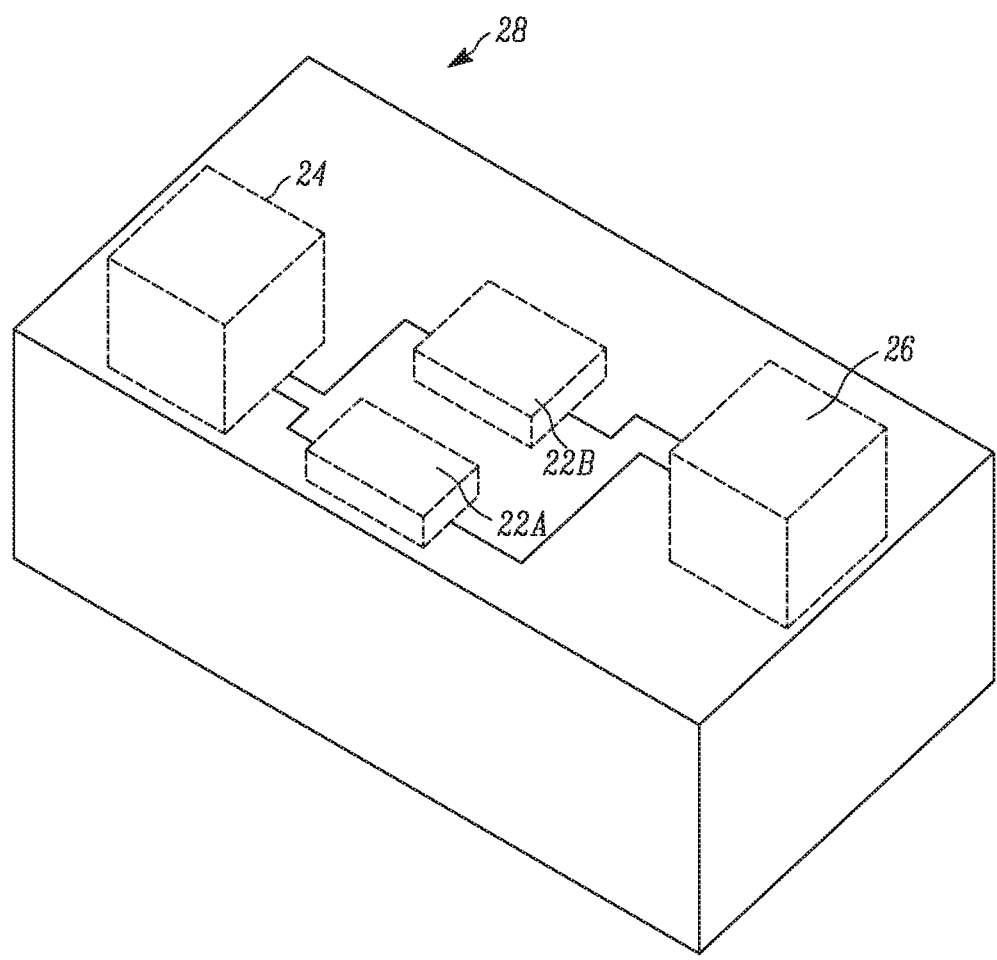
FIG. 3 is a perspective view of several parts of an optimized infrastructure-based warning system integrated into a single component, according to embodiments of the present invention.

Another embodiment of the present invention is shown in FIG. 2, with like numbers referring to like elements. However, in this embodiment, the intersection 14 includes additional posts 20A,20B,20C, and additional markers 30A,30B, 30C, and each post 20,20A,20B,20C includes a corresponding component 28 having a camera 22A, radar 22B, communication device 24, and warning device 26. In this embodiment, a determination is made as to whether each camera 22A is able to detect one or more of the markers 30,30A,30B,30C. For example, if the camera 22A of the component 28 mounted to the post 20 is unable to detect one or more of the markers 30,30A,30B,30C, then the information obtained from the radar 22B is used. This process is repeated for each camera 22A that is part of the component 20 mounted to a corresponding post 20A,20B,20C, such that the most accurate information regarding each vehicle 18A, 18B and VRU 12 may be obtained.

In order for the camera 22A to be used to provide information, the camera 22A must be able to detect at least one of the markers 30,30A,30B,30C. During conditions when the camera 22A is obstructed, such as a result from exposure to snow and ice, there may be situations where the snow or ice may only obstruct a portion of the view of the camera 22A, such that the camera 22A may only be able to detect one of the markers 30,30A,30B,30C, and therefore may not be able to detect all of the objects in the detection area 22C. When this occurs, any information that is unobtainable by the camera 22A may be obtained by the radar 22B. This process may be repeated to determine which camera 22A is able to detect one or more of the markers 30,30A,30B,30C, and the combined information from each camera 22A and each radar 22B may be used to determine whether a warning alert is needed.

In the embodiments shown in FIGS. 1 and 2, the marker 30 is shown at ground level. The marker 30 being placed at ground level allows for extrinsic calibrations of the camera 22A. However, it is within the scope of the invention that the marker 30, or additional markers, may be located at other locations as well such that the camera 22A may be used to detect objects in other detection areas. Furthermore, there may be additional cameras at different locations which may be used to detect various objects in one or more detection areas, and are used with different markers to optimize the operation of each camera. There also may be additional radars which may be used when the effectiveness of one or more of the cameras has become limited due to the conditions mentioned above.

Additionally, in some embodiments the radar 22B is deactivated when the camera 22A is being used to detect objects in the detection area 22C, and the camera 22A is deactivated when the radar 22B is being used to detect objects in the detection area 22C. This improves the energy efficiency of the system 10. In other embodiments, the camera 22A and the radar 22B may be used simultaneously, to provide redundancy when detecting objects in the detection area 22C in case the camera 22A suddenly is unable to detect objects in the detection area 22C. Information is therefore still provided to the communication device 24 by the radar 22B regarding objects in the detection area 22C, such that the overall functionality of the system 10 is maintained.

In one embodiment, the communication device 24 is a dedicated short range communication (DSRC) device 24, but it is within the scope of the invention that other types of communication devices maybe used.

In alternate embodiments, instead of being part of the component, the warning device 26 may be integrated into one or more cell phones, tablets, or other computing device capable of communication with the communication device 24, where the computing device is used by one of the VRUs 12A,12B. The warning device 26 may provide a visual alert, such as a warning on a screen of the computing device, an audible sound produced by the computing device, or a haptic warning, where the computing device vibrates to provide one of the VRUs 12A,12B that there is a danger of a collision with one of the vehicles 18A,18B.

While the radar 22B is described in the embodiments above, it is within the scope of the invention that other types of detection devices may be used when the operation of the camera 22A has become compromised. Other types of detection devices may be included, such as, but not limited to, LIDAR (Light Imaging, Detection, and Ranging), LADAR (Laser Imaging, Detection, and Ranging), other types of radar, ultrasound, or sonar.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   an infrastructure-based warning system, including:
      a camera;
      a detection area, the camera operable for detecting at least one of the location, speed, and direction of each of a plurality of objects in the detection area;
      a radar device operable for detecting at least one of the location, speed, and direction of each of the plurality of objects in the detection area;
      a plurality of markers located within the detection area, the camera operable for detecting the plurality of markers;
      an optimization function, wherein the optimization function includes using information obtained by the radar device when the camera is unable to detect the at least one of the plurality of markers, wherein the information from the radar device is information associated with the location of the at least one of the plurality of markers that the camera is unable to detect.

2. The apparatus of claim 1, wherein the at least one marker is located at ground level, and the camera is calibrated using the at least one marker.

3. The apparatus of claim 1, further comprising:
a first communication device in electrical communication with the camera and the radar device; and
wherein first communication device uses information from the camera when the camera is able to detect the marker, and the first communication device uses information from the radar device when the camera is unable to detect the marker.

4. The apparatus of claim 3, further comprising:
a warning device in electrical communication with the first communication device;
wherein the first communication device commands the warning device to generate a warning signal based on information received from the camera when the camera is able to detect the marker, and the first communication device commands the warning device to generate the warning signal based on information received from the radar device when the camera is unable to detect the marker.

5. The apparatus of claim 4, one of the plurality of objects further comprising at least one vehicle, wherein the warning device generates the warning signal and directs the warning signal to the at least one vehicle when there is a potential risk of collision with another of the plurality of objects in the detection area based on a detected location, speed and direction of the at least one vehicle and another of the plurality of objects in the detection area.

6. The apparatus of claim 4, one of the plurality of objects further comprising at least one vulnerable road user, wherein the warning device generates the warning signal and directs the warning signal to the at least one vulnerable road user when there is a potential risk of collision with another of the plurality of objects in the detection area based on a detected location, speed and direction of the at one vulnerable road user and another of the plurality of objects in the detection area.

7. The apparatus of claim 1, further comprising at least one infrastructure component, wherein the camera and the radar device are connected to the at least one infrastructure component.

8. The apparatus of claim 7, the at least one infrastructure component being one selected from the group consisting of a building, a bridge, a parking structure, and a support structure.

9. A method for optimizing an infrastructure based warning system, comprising the steps of:
providing a camera;
providing a detection area;
providing at least one radar;
providing a plurality of markers located within the detection area;
detecting at least one of the location, speed, and direction of each of a plurality of objects in the detection area with the camera;
detecting at least one of the location, speed, and direction of each of a plurality of objects in the detection area with the at least one radar;
detecting the plurality of markers with the camera;
determining the camera is unable to detect at least one of the plurality of markers; and
generating a warning by using information obtained by the at least one radar when the camera is unable to detect the at least one marker, wherein the information from the radar device is information associated with the location of the at least one of the plurality of markers that the camera is unable to detect.

10. The method of claim 9, further comprising the steps of:
providing the at least one marker to be located at ground level;
calibrating the camera using the at least one marker.

11. The method of claim 9, further comprising the steps of:
providing a first communication device in electrical communication with and able to process information from both the camera and the at least one radar;
processing information sent from the camera to the first communication device when camera is able to detect the marker;
processing information from the at least one radar when the camera is unable to detect the marker.

12. The method of claim 11, further comprising the steps of:
providing a warning device in electrical communication with the first communication device such that the first communication device is able to command the warning device to generate a warning signal;
commanding the warning device to generate a warning signal based on information received from the camera when the camera is able to detect the marker;
commanding the warning device to generate the warning signal based on information received from the at least one radar when the camera is unable to detect the marker.

13. The method of claim 9, further comprising the steps of:
providing one of the plurality of objects to be at least one vehicle;
generating the warning signal with the warning device;
directing the warning signal to the at least one vehicle when there is a potential risk of collision with another of the plurality of objects in the detection area based on a detected location, speed and direction of the at least one vehicle and another of the plurality of objects in the detection area.

14. The method of claim 9, further comprising the steps of:
providing one of the plurality of objects to be at least one vulnerable road user;
generating the warning signal with the warning device;
directing the warning signal to the at least one vulnerable road user when there is a potential risk of collision with another of the plurality of objects in the detection area based on a detected location, speed and direction of the at least one vulnerable road user and another of the plurality of objects in the detection area.

15. The method of claim 9, further comprising the steps of providing at least one infrastructure component such that the camera and the at least one radar are connected to the at least one infrastructure component.

16. The method of claim 15, further comprising the steps of providing the at least one infrastructure component to be one selected from the group consisting of a building, a bridge, a parking structure, and a support structure.

17. The apparatus of claim 1, further comprising a second camera;

a second detection area, the camera operable for detecting at least one of the location, speed, and direction of each of a plurality of objects in the second detection area;
a radar device operable for detecting at least one of the location, speed, and direction of each of the plurality of objects in the second detection area;
a second plurality of markers located within the second detection area, the camera operable for detecting the second plurality of markers;
an optimization function, wherein the optimization function includes using information obtained by the second radar device when the second camera is unable to detect the at least one of the second plurality of markers, wherein the information from the second radar device is information associated with the location of the at least one of the second plurality of markers that the camera is unable to detect.

18. The apparatus of claim 17, wherein the first detection area and the second detection area are at least partially overlapping one another.

19. The apparatus of claim 17, wherein at least one marker is part of the first plurality of markers and the second plurality of markers.

20. The method of claim 9, further comprising
providing a second camera;
providing a second detection area;
providing a second radar;
providing a second plurality of markers located within the second detection area;
detecting at least one of the location, speed, and direction of each of a plurality of objects in the second detection area with the second camera;
detecting at least one of the location, speed, and direction of each of a plurality of objects in the second detection area with the second radar;
detecting the second plurality of markers with the second camera;
determining the camera is unable to detect at least one of the second plurality of markers; and
generating a warning by using information obtained by the second radar when the camera is unable to detect the at least one marker of the second plurality of markers, wherein the information from the second radar device is information associated with the location of the at least one of the second plurality of markers that the second camera is unable to detect.

21. The method of claim 20, wherein the first detection area and the second detection area are at least partially overlapping one another.

22. The method of claim 20, wherein at least one marker is part of the first plurality of markers and the second plurality of markers.

* * * * *